(12) United States Patent
Gering et al.

(10) Patent No.: US 12,333,071 B2
(45) Date of Patent: Jun. 17, 2025

(54) METHOD AND DEVICE FOR DETERMINING A DIRECTION OF GAZE OF AN EYE AND DATA GLASSES

(71) Applicant: Robert Bosch GmbH, Stuttgart (DE)

(72) Inventors: Stefan Gering, Weissach (DE); Johannes Meyer, Haseluenne (DE); Thomas Alexander Schlebusch, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/693,840

(22) PCT Filed: Mar. 2, 2023

(86) PCT No.: PCT/EP2023/055273
§ 371 (c)(1),
(2) Date: Mar. 20, 2024

(87) PCT Pub. No.: WO2023/208452
PCT Pub. Date: Nov. 2, 2023

(65) Prior Publication Data
US 2024/0329735 A1    Oct. 3, 2024

(30) Foreign Application Priority Data
Apr. 27, 2022   (DE) .................. 10 2022 204 107.0

(51) Int. Cl.
*G06F 3/01*   (2006.01)
*G01B 11/02*  (2006.01)
(Continued)

(52) U.S. Cl.
CPC ............ *G06F 3/013* (2013.01); *G01B 11/026* (2013.01); *G01B 11/26* (2013.01); *G02B 27/0093* (2013.01); *G02B 2027/0178* (2013.01)

(58) Field of Classification Search
CPC .......................... G06F 3/012; G02B 27/0172
See application file for complete search history.

(56) References Cited

U.S. PATENT DOCUMENTS

2019/0212813 A1 * 7/2019 Yang .................. G02B 27/0172
2022/0121279 A1   4/2022 Petersen et al.

FOREIGN PATENT DOCUMENTS

DE   102020206821 A1   12/2021
DE   102020206822 A1   12/2021

OTHER PUBLICATIONS

International Search Report for PCT/EP2023/055273, Issued May 16, 2023.

(Continued)

*Primary Examiner* — Kevin M Nguyen
(74) *Attorney, Agent, or Firm* — NORTON ROSE FULBRIGHT US LLP (57) ABSTRACT

A method for determining a direction of gaze of an eye for data glasses. The method includes: reading distance values and speed values, which represent a distance between laser sensors for emitting laser beams and surface intersection points of the laser beams on the eye and also surface speeds at the surface intersection points; classifying the distance values and the speed values in order to obtain classification values which indicate the parts of the eye associated with the surface intersection points; estimating position values which represent positions of the laser sensors using the distance values, the speed values, and the classification values; and ascertaining a gaze direction value which represents the gaze direction using the position values, the distance values, and the speed values.

12 Claims, 7 Drawing Sheets

(51) Int. Cl.
    *G01B 11/26*     (2006.01)
    *G02B 27/00*     (2006.01)
    *G02B 27/01*     (2006.01)

(56) References Cited

OTHER PUBLICATIONS

Meyer et al., "A CNN-Based Human Activity Recognition System Combining a Laser Feedback Interferometry Eye Movement Sensor and an IMU for Context-Aware Smart Glasses," Proceedings of the ACM on Interactive, Mobile, Wearable and Ubiquitous Technologies, vol. 5, No. 4, 2021, pp. 1-24.

* cited by examiner

METHOD AND DEVICE FOR DETERMINING A DIRECTION OF GAZE OF AN EYE AND DATA GLASSES

FIELD

The present invention relates to a device or a method for determining a direction of gaze of an eye, and data glasses. The present invention also relates to a computer program.

BACKGROUND INFORMATION

The aim of eye tracking with wearable devices, also referred to as gaze detection, is the precise estimation of the gaze angle in order to derive information about the direction of gaze therefrom or to adjust display information on the basis of the eye position. The technical implementations range from video-oculography systems (VOG) to special tracking devices based on the method of pupil-corneal reflection.

For the general task of classification, many methods are available that are suitable for a wide range of applications. Compared to the related task of (unmonitored) clustering, the classification task requires problem-related knowledge of how the clusters are to be named.

SUMMARY

Against this background, the present invention provides a method for determining a direction of gaze of an eye, in addition, a device that uses this method, and finally a corresponding computer program as well as data glasses. Advantageous developments and improvements of the device disclosed herein are made possible by the measures disclosed herein.

According to an example embodiment of the present invention, a method for determining a direction of gaze of an eye comprises the following steps:

Reading a first distance value and a first speed value, wherein the first distance value represents a distance between a first laser sensor for emitting a first laser beam and a first surface intersection point of the laser beam on the eye, and wherein the first speed value represents a surface speed at the first surface intersection point, a second distance value and a second speed value, wherein the second distance value represents a distance between a second laser sensor for emitting a second laser beam and a second surface intersection point of the laser beam on the eye, and wherein the second speed value represents a surface speed at the second surface intersection point, and at least a third distance value and a third speed value, wherein the third distance value represents a distance between a third laser sensor for emitting a third laser beam and a third surface intersection point of the laser beam on the eye, and wherein the third speed value represents a surface speed at the third surface intersection point; and ascertaining a gaze direction value which represents the gaze direction using the distance values and the speed values.

The method can advantageously be used in connection with a device that can be worn by an individual, for example data glasses. The laser sensors can, for example, be arranged on a frame of the wearable device. The distance values and the speed values can represent measured values or values determined from measured values. For example, a transit time measurement, a detection of a Doppler shift or an evaluation of a change in a signal property caused by interference can be carried out for this purpose. The surface intersection point can represent a position at a part of the eye at which a laser beam is reflected. Such a part can represent the iris or retina, for example. The surface speed can thus result from a movement of the part of the eye at which the corresponding surface intersection point is located.

According to an example embodiment of the present invention, the method can comprise a step of classifying the distance values and the speed values. By means of the classification, a first classification value can be obtained which indicates a part of the eye associated with the first surface intersection point, a second classification value can be obtained which indicates a part of the eye associated with the second surface intersection point, and a third classification value can be obtained which indicates a part of the eye associated with the third surface intersection point. In the ascertainment step, the gaze direction value can be ascertained using the classification values. Using a suitable classifier, it is easily possible to ascertain where on the eye the individual laser beams are reflected. Possible parts of the eye that can be indicated by the classification values include, for example, the sclera, the iris, the retina, and the eyelid of the eye, or a subset of the mentioned parts.

According to an example embodiment of the present invention, the method can include a step of determining a first absolute value which represents a pose of the first laser sensor in head-centered coordinates of a head-centered coordinate system, a second absolute value which represents a pose of the second laser sensor in the head-centered coordinates, and a third absolute value which represents a pose of the third laser sensor in the head-centered coordinates. Here the absolute values can be determined by using the distance values and the classification values.

Optionally, the method can comprise a step of estimating a first position value, which represents a position of the first laser sensor, a second position value, which represents a position of the second laser sensor, and a third position value, which represents a position of the third laser sensor. The estimation step can be performed using the distance values, the speed values, and the classification values. In the ascertainment step, the gaze direction value can be ascertained using the position values, the distance values, and the speed values. Estimation may be performed using a suitable estimation method.

For example, from the position values and the classification values, the position and orientation of the sensors can then be determined in head-centered coordinates. For this optional step, the distance measurement values are used which as measurement points are associated with the sclera and thus with the eyeball of a known fixed radius r sclera. From the known position values in glasses-centered coordinates and from the measured distance, the point of incidence on the sclera can be determined and, using the known radius r sclera, the eyeball with its center can be ascertained in relation to the position values of the laser sensors. For this purpose, the ball is fitted with r sclera into a batch of sclera measured values.

According to an example embodiment of the present invention, the glasses coordinate system can advantageously be set and tracked in relation to the head coordinate system, as a result of which the gaze direction can be tracked robustly and so as to be error-free even when the glasses slip on the nose.

According to an example embodiment of the present invention, the method can comprise a step of determining angular speeds which represent an eye surface speed of the eye. The angular speeds can be determined using the surface intersection points and a linkage between the head-centered coordinate system and the glasses coordinate system. In addition, the method can comprise a step of determining an offset-encumbered gaze direction using the angular speeds.

In a further step, the eye surface speed can thus be determined for all measured values as a projection of the measured speed in the laser beam direction. The linkage of the coordinate systems ascertained in the preceding step is used for this purpose as are the surface intersection points. The offset-encumbered gaze direction is then determined, for example, via the integration of the surface speed.

In order to finally determine the offset-free and thus the correct gaze direction, a reduced eye model is optionally used in a third step, by means of which the offset of the gaze angle is determined. The eye model is determined or fitted from the distance and speed measurement points and the previously determined surface intersection points. Here the iris can be regarded as a simple plane with a normal vector that corresponds to the absolute gaze angle in the eye coordinate system.

Finally, the correct gaze direction can be determined via the offset-encumbered gaze direction ascertained from the integrated speed measurement and the correction of the offset via the reduced eye model.

The method can thus comprise a step of ascertaining a gaze direction value which represents the gaze direction using the offset-encumbered gaze direction and an offset for correcting the offset-encumbered gaze direction.

According to an example embodiment of the present invention, in a determination step, parameters of the linkage between the head-centered coordinate system and the glasses coordinate system can be determined using the position values, the distance values and also known geometric assumptions regarding the eye. The geometric assumptions can be based, for example, on a model of the eye.

The offset-encumbered gaze direction can optionally be determined by integration of the angular speeds.

The offset can be determined using an eye surface model that is determined from the distance values, the speed values and the surface intersection points.

Optionally, according to an example embodiment of the present invention, the eye surface model can be learned over time from measured values. The method can thus comprise a step of continuously learning the eye surface model over time from captured data points. Advantageously, the data points can be based on measured values of the laser sensors.

According to an example embodiment of the present invention, the method can comprise a step of receiving a first reflection beam which represents a reflection or scattering of the first laser beam at the first surface intersection point, of receiving a second reflection beam which represents a reflection or scattering of the second laser beam at the second surface intersection point, and of receiving a third reflection beam which represents a reflection or scattering of the third laser beam at the third surface intersection point. In addition, the method can comprise a step of determining the first distance value and the first speed value using a fluctuation in a radiation intensity of the first reflection beam, of determining the second distance value and the second speed value using a fluctuation in a radiation intensity of the second reflection beam and of determining the third speed value using a fluctuation in a radiation intensity of the third reflection beam. Advantageously, fluctuations based on the effect of interference can be evaluated here.

According to an example embodiment of the present invention, the method can comprise a step of emitting the first laser beam at a constant wavelength, the second laser beam at a constant wavelength and the third laser beam at a constant wavelength. In the determination step, the first speed value can be determined using the fluctuation in the radiation intensity of the first reflection beam while the first laser beam is being emitted at the constant wavelength, the second speed value is determined using the fluctuation in the radiation intensity of the second reflection beam while the second laser beam is being emitted at the constant wavelength, and the third speed value is determined using the fluctuation in the radiation intensity of the third reflection beam while the third laser beam is being emitted at the constant wavelength. This makes a simple determination of the respective surface speeds possible.

Correspondingly, according to an example embodiment of the present invention, in the emission step the first laser beam can be emitted at a changing wavelength during a first further time interval, the second laser beam can be emitted at a changing wavelength during a second further time interval, and the third laser beam can be emitted at a changing wavelength during a third further time interval. In the determination step, the first distance value can be determined using the fluctuation in the radiation intensity of the first reflection beam while the first laser beam is being emitted at the changing wavelength; the second distance value can be determined using the fluctuation in the radiation intensity of the second reflection beam while the second laser beam is being emitted at the changing wavelength; the third distance value can be determined using the fluctuation in the radiation intensity of the third reflection beam while the third laser beam is being emitted at the changing wavelength. A changing wavelength can be understood to mean a wavelength variation of the laser radiation emitted by the respective laser sensors. A simple determination of the distances between the respective sensors and the corresponding reflection points is thus made possible.

According to an example embodiment of the present invention, the method can comprise a step of determining a first beat frequency using the fluctuations in the radiation intensity of the first reflection beam while the first laser beam is being emitted at the constant and at the changing wavelength; of determining a second beat frequency using the fluctuations in the radiation intensity of the second reflection beam while the second laser beam is being emitted at the constant and at the changing wavelength; and of determining a third beat frequency using the fluctuations in the radiation intensity of the third reflection beam while the third laser beam is being emitted at the constant and at the changing wavelength. In a determination step, a movement direction value which represents a movement direction of the eye and a movement speed value which represents a movement speed of the eye can be determined using a mean value of the beat frequencies. In the ascertainment step, the gaze direction value can be ascertained using the movement direction value and the movement speed value of the eye. In this way, the effects resulting from a constant and a changing wavelength of the emitted laser beams can be used to ascertain the gaze direction and also the movement of the eye.

This method can be implemented, for example, in software or hardware or in a mixed form of software and hardware, for example in a control device.

The present invention also provides a device for determining a direction of gaze of an eye. The device is designed to carry out, control, or implement the steps of a variant of a method presented here in corresponding devices. The object of the invention can also be achieved quickly and efficiently by this design variant of the present invention in the form of a device.

For this purpose, the device can have at least one computing unit for processing signals or data, at least one memory unit for storing signals or data, at least one interface to a sensor or an actuator for reading sensor signals from the sensor or for outputting data signals or control signals to the actuator, and/or at least one communication interface for reading or outputting data embedded in a communication protocol. The computing unit can, for example, be a signal processor, a microcontroller or the like, wherein the memory unit can be a flash memory, an EEPROM, or a magnetic memory unit. The communication interface can be designed to read or output data wirelessly and/or in a wired form, a communication interface, which can read or output wired data, being able to read these data, for example electrically or optically, from a corresponding data transmission line, or being able to output these data into a corresponding data transmission line.

In the present case, a device can be understood to be an electrical device that processes sensor signals and, on the basis of these signals, outputs control and/or data signals. The device can have an interface that can be designed as hardware and/or software. In a hardware embodiment, the interfaces can, for example, be part of a so-called system ASIC, which contains a wide variety of functions of the device. However, it is also possible for the interfaces to be separate integrated circuits or at least partially consist of discrete components. In the case of a software embodiment being used, the interfaces can be software modules that are present, for example, on a microcontroller in addition to other software modules.

A corresponding device can advantageously be realized in connection with data glasses which, in addition to the device, comprise at least three laser sensors for emitting laser beams in the direction of the eye and for receiving reflection beams reflected from the eye.

A computer program product or a computer program having program code that can be stored on a machine-readable carrier or storage medium, such as a semiconductor memory, a hard disk memory, or an optical memory, and that is used for carrying out, implementing, and/or controlling the steps of the method according to one of the embodiments of the present invention described herein is advantageous as well, in particular when the program product or program is executed on a computer or a device.

Exemplary embodiments of the present invention are illustrated in the figures and explained in more detail in the following description.

BRIEF DESCRIPTION OF EXAMPLE EMBODIMENTS

DETAILED DESCRIPTION OF EXAMPLE EMBODIMENTS

In the following description of advantageous exemplary embodiments of the present invention, the same or similar reference signs are used for the elements shown in the various figures and acting similarly, as a result of which a repeated description of these elements is omitted.

Figure 1:
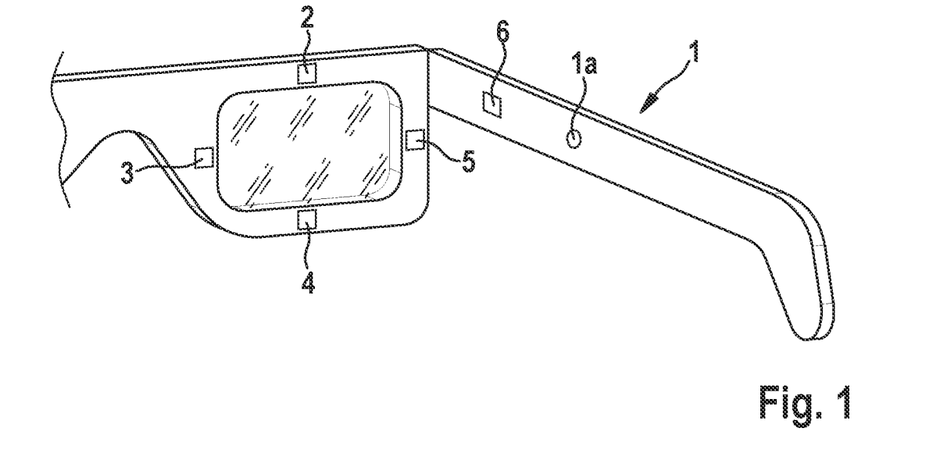
FIG. 1 shows a section of a pair of data glasses according to an exemplary embodiment of the present invention.

FIG. 1 shows a section of a pair of data glasses 1 as an exemplary embodiment of a wearable device. By way of example, a plurality of laser sensors 2, 3, 4, 5, 6 are shown, which are arranged on the data glasses 1. The number of laser sensors 2, 3, 4, 5, 6 can be selected freely, wherein, according to an exemplary embodiment, at least three laser sensors 2, 3, 4, 5, 6 are required. Optionally, a device 1a is arranged on the data glasses 1, which device is used to determine a direction of gaze of an eye using sensor values of the laser sensors 2, 3, 4, 5, 6, at which eye laser beams of the laser sensors 2, 3, 4, 5, 6 are directed. The device 6a thus represents a signal processing unit which is coupled to the laser sensors 2, 3, 4, 5, 6 so as to transmit signals. According to an exemplary embodiment, the laser sensors 2, 3, 4, 5, 6 are designed as static sensors which are fastened, for example, rigidly to a frame of the data glasses 1.

According to an exemplary embodiment, each of the laser sensors 2, 3, 4, 5, 6 is designed to emit a single laser beam. In addition, according to an exemplary embodiment, the laser sensors 2, 3, 4, 5, 6 are implemented separately and arranged at a distance from one another, for example at a distance of at least 5 millimeters.

With the approach described here, eye tracking, i.e., gaze detection or gaze tracking, can be achieved with an arrangement of a plurality of static laser sensors by means of a data-based approach. For this purpose, an estimation can be performed which is carried out mainly or exclusively on the basis of the data provided by the laser sensors 2, 3, 4, 5, 6 themselves and not on the basis of geometric models for which high-quality parameters need to be known in advance or which must be solved very accurately during the transit time. Instead, the proposed approach, which can be implemented, for example, in the form of an algorithm, requires no or almost no previous knowledge about the eye size of the eye for which the gaze direction is to be determined. Furthermore, the approach also works should the measuring device slip, here for example the data glasses 1. The approach thus makes possible eye tracking based on static laser sensors 2, 3, 4, 5, 6 with an uncertain position.

Advantageously, neither is a camera required for capturing the eye.

According to an exemplary embodiment, the proposed approach requires in hardware only a few static lasers rather than an entire camera or laser scanners. Corresponding lasers are integrated by way of example in the laser sensors 2, 3, 4, 5, 6. The proposed approach is inexpensive due to the lower hardware requirements and is more robust compared to scanning devices, since only static lasers are required. According to an exemplary embodiment, the laser sensors 2, 3, 4, 5, 6 are able to measure the distance and speed with a refresh rate of at least 1 kHz, so that the refresh rate of the eye position is above 1 kHz on the basis of the proposed algorithm. In addition, the sensors are tiny, for example larger or smaller than 2 millimeters, so that they can be seamlessly integrated into glasses frames, lenses, and temples. In addition, the algorithm is extremely lean so that it can be run on an integrated device with low power consumption.

From an algorithmic point of view, compared to model-based estimation approaches the approach is not dependent on numerous higher-value parameters. Instead, the sensor position of the individual laser sensors 2, 3, 4, 5, 6 is estimated during the transit time, as is the eye position itself. The algorithm itself can easily be adapted to a changing number of sensors. This is useful for different hardware settings with a varying number of sensors, as well as for cases in which individual sensors are either malfunctioning or not directed exactly onto the eye. In addition, the time to convergence is short (in the sub-second range), which is advantageous in the event of a slip or a blink.

The functional principle of a laser used for the laser sensors 2, 3, 4, 5, 6 is based on optical resonators. Within the resonator, the electrons are excited by external energy supply. The radiation generated by spontaneous emission is reflected back and forth in the optical resonator and leads to stimulated emission, whereby the resonance mode is amplified and coherent radiation is generated. On one side of such a laser resonator, the laser radiation can couple into the free space via a semitransparent mirror. According to an exemplary embodiment, a surface emitter, a so-called vertical-cavity surface-emitting laser (VCSEL), is used for the laser sensors 2, 3, 4, 5, 6, in which laser the mirror structures are realized as Bragg mirrors, a so-called distributed Bragg reflector (DBR). The underlying physical effect used in the approach described here is so-called "laser self-mixing". When laser radiation scattered from the outside couples the reflection beam back into the laser resonator, the stimulated emission is modulated on the basis of the phase of the backscattered photons. For example, such a scattered laser radiation can be a reflection beam which can represent a part of a laser beam emitted by one of the laser sensors 2, 3, 4, 5, 6 that is reflected at a surface intersection point of a part of the eye. When twice the distance between the laser resonator and the external scattering area (there and back) corresponds to an integer multiple of the wavelength, the scattered radiation and the radiation in the interior of the laser resonator will be in phase. This leads to a positive interference, the laser threshold is lowered and laser power is slightly increased, which is detected by a photodiode which is integrated in the laser sensors 2, 3, 4, 5, 6 according to an exemplary embodiment. At a slightly greater distance, both radiation waves are phase-shifted, and at some time or another a negative interference occurs which reduces the laser output power. If the distance from the scattering surface is changed at a constant speed, the laser power will fluctuate between a maximum in the case of constructive interference and a minimum in the case of destructive interference. The resulting oscillation is a function of the speed of the scatterer and of the laser wavelength. The same effect (oscillating laser output power) can be observed if the distance between the laser resonator and the scattering surface remains constant but the laser wavelength is changed. The phase of the radiation between the inner cavity (within the laser) and the outer cavity (between the laser and the scattering) now depends on how many wavelengths "fit" into the outer cavity. However, the oscillation frequency depends on the distance between the laser and the scattering surface, since the wavelength in the near-infrared range is approximately 850 nm and the distances from the external cavity are several dozen millimeters, so that a slight change in the laser wavelength can lead to a complete rotation of the laser phase in the external cavity. The greater the distance, the smaller the change in wavelength which leads to a complete change in the phase of the laser in the external resonator. When the fluctuations of the laser output power are considered, it can be seen that the higher the frequency of the power fluctuations with a constant change in the laser wavelength, the greater the distance from the scatterer. When the power monitoring of the photodiode is therefore mapped in the frequency range, the peak frequency will correlate with the distance of the scatterer. The change in the laser wavelength can be achieved by power modulation of the VCSEL. For example, a linear modulation with a triangular laser current can be achieved. Other known modulation methods such as quadrature and sine can also be used.

If both effects are superimposed, beat frequencies will occur as are known from frequency-modulated continuous-wave radar systems (FMCW). Due to the Doppler shift of the frequency, the resulting beat frequency for a target that is moving toward the sensor will be lower when the frequency is increased and higher when the frequency is lowered. For this reason, the beat frequencies for the rising and the falling modulation segment must be calculated individually. The mean value of the two frequencies is an indicator of the distance of the target, while the difference correlates with half the Doppler frequency.

In the case of the data glasses 1 shown by way of example in FIG. 1, the temple and the lens frame in this example contain the laser sensors 2, 3, 4, 5, 6 in the form of so-called ViP components. The laser beams of the laser sensors 2, 3, 4, 5 are arranged such that they focus four points on the surface of the eye.

The laser sensors 2, 3, 4, 5, 6 could also be integrated into the lens or the nose pads. In a further possible embodiment, the laser sensors 2, 3, 4, 5, 6 are arranged in the temple, but radiate toward the lens of the data glasses 1. According to an exemplary embodiment, a holographic optical element (HOE) embedded in the lens is designed in such a case to deflect the beams toward the eye. The arrangement can be operated in different modalities. Firstly, the laser is operated with a continuous wave (constant frequency), i.e., constant wavelength. Secondly, the frequency of the laser is modulated over time, e. g., according to a triangular modulation pattern, as described above, so that there is a changing wavelength.

Figure 2:
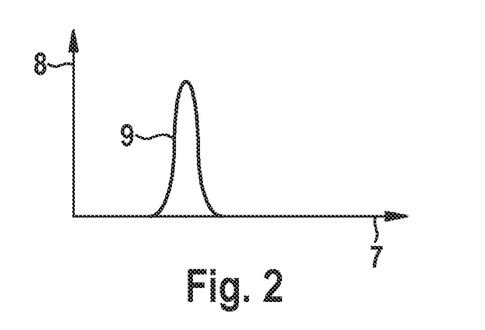
FIG. 2 shows a spectrum of a non-modulated sensor during constant movement according to an exemplary embodiment of the present invention.

FIG. 2 shows a spectrum of a non-modulated sensor during constant movement. It is thus a spectrum in the frequency range for the first case described above at a constant frequency and constant speed of the scattering object. The scattering object is here the eye or a part of the eye at which the laser beams are reflected or scattered. An amplitude axis 8 and a frequency axis 7 are shown. Here, the Doppler frequency shift refers to a peak frequency 9 of the spectrum.

Figure 3A:
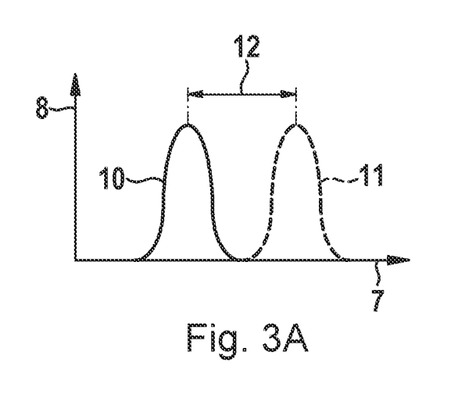
FIGS. 3A and 3B show a spectrum for the movement of a scattering object during simultaneous modulation of a sensor according to an exemplary embodiment of the present invention.
Figure 3B:
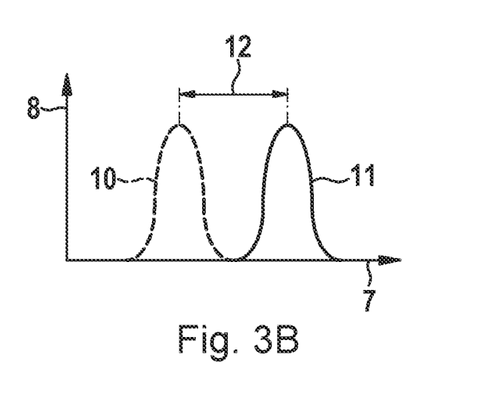

FIGS. 3A and 3B show, in contrast to FIG. 2, an exemplary spectrum for the movement of the scattering object during simultaneous modulation of the sensor. It is thus a spectrum for the aforementioned second, modulated operating mode, again at a constant speed of the scatterer. Corresponding to FIG. 2, the spectrum is shown with the amplitude axis 8 and the frequency axis 7. Here, the scatterer is the eye or a part of the eye at which the laser beams are reflected or scattered. In the absence of movement, a spectrum results as in FIG. 2, but now the peak frequency 10, 11 determines the distance between the sensor and the scattering surface. With additional movement, the peak frequency 10, 11 shifts upward or downward, depending on the modulation ramp sequence (upward or downward) and speed vector (toward the sensor or away from the sensor). The resulting spectra for the two ramp sequences are shown in FIGS. 3A and 3B. The direction and absolute speed of the movement can be estimated on the basis of the separation of the peak frequency 12 between the rising and falling slopes.

Figures 4, 5, 6:
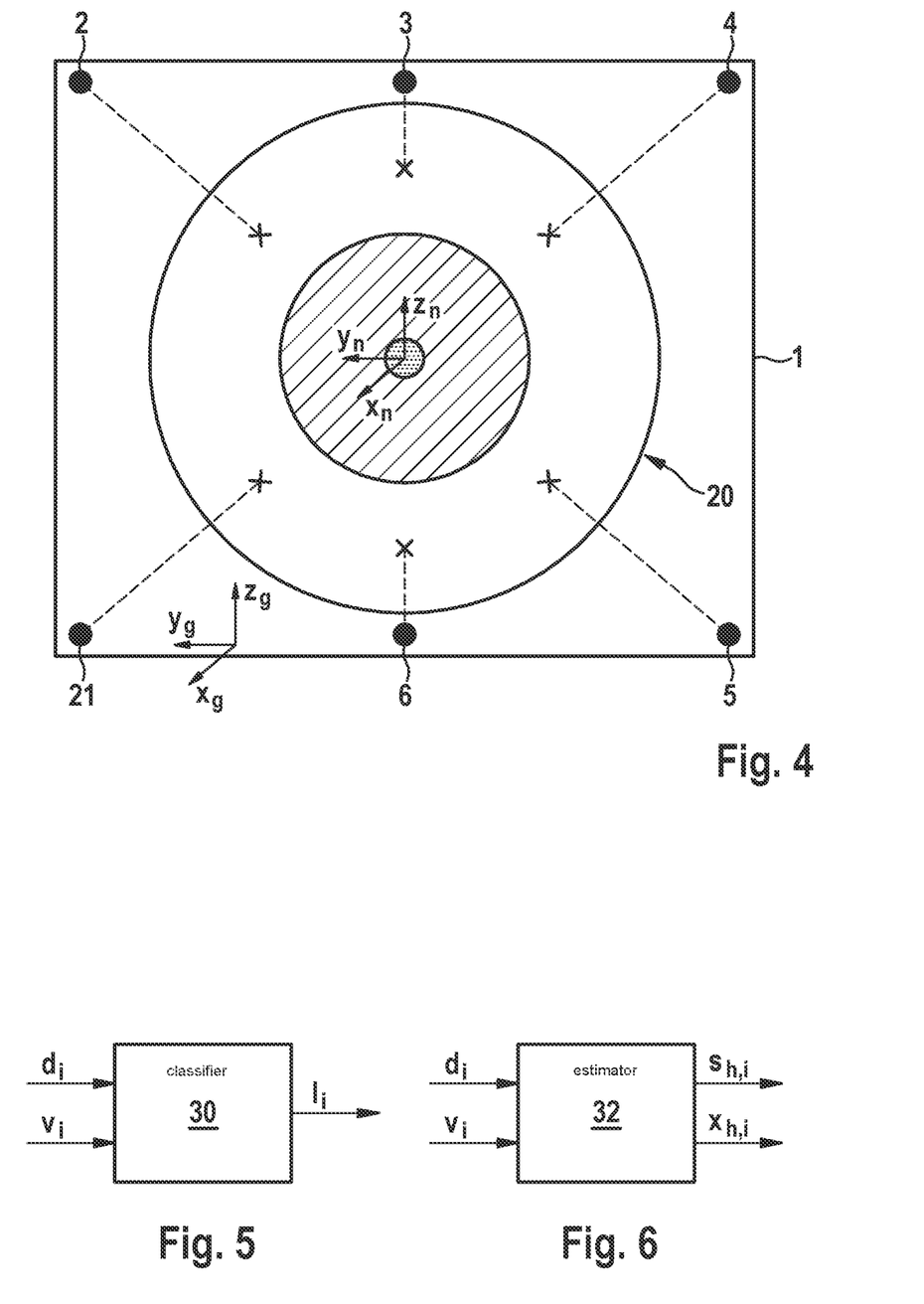
FIG. 4 shows a model of a pair of glasses according to an exemplary embodiment of the present invention.
FIG. 5 shows a classifier for surface classification according to an exemplary embodiment of the present invention.
FIG. 6 shows an estimator for estimating absolute sensor positions and intersection points in head-centered coordinates according to an exemplary embodiment of the present invention.

FIG. 4 shows a model of a pair of glasses, for example data glasses 1, with six laser sensors 2, 3, 4, 5, 6, 21 directed at an eye 20. The approach described requires a plurality of static lasers attached to a wearable device, e.g., a pair of glasses.

The lasers are able to simultaneously measure the distance to a solid object and also its surface speed along the laser line. In the following, it is assumed that all lasers of the laser sensors 2, 3, 4, 5, 6, 21 are directed either onto the sclera, the iris or the retina of the eye 20. Further cases, such as lasers not pointing at the eye surface, blinking of the eyelids, etc., are excluded for reasons of brevity, but the approach can be expanded for such cases. In addition, it is assumed that all laser sensors 2, 3, 4, 5, 6, 21 are fixedly connected to the wearable device, so that the relative position between the lasers and their alignment relative to a main frame, here the data glasses 1, remain constant (e.g., "glasses-centered coordinates").

The task of estimating the eye position in the case of an unknown laser position can be divided into three steps:
1. Classification of the surface
2. Absolute sensor position
3. Estimation of the eye position For the first task, it is assumed that the relative position and orientation of the laser sensors 2, 3, 4, 5, 6, 21 in relation to the eye 20 are unknown. Nevertheless, the evaluation of the distance measurements can provide information about whether the laser is directed specifically onto the sclera and thus delivers a relatively constant sclera radius value, whether there is a fall-off onto the iris disk or an even greater fall-off onto the retina. A classifier function that acts on the distance signal thus provides the first important information about the position between laser and eye 20.

As an additional feature, the scattering behavior by different parts of the eye 20, e.g., iris, sclera, retina, eyelids, that leads to a variation in the signal quality can be used to determine on which part the laser beam lies. An initial calibration gesture of the eye 20 can be used to classify the part, e.g., rolling the eye 20 and blinking, and a multimodal distribution can be adapted to the captured SNR and distance features in order to train a classifier and obtain corresponding decision boundaries.

The second task is computationally more complex: on the basis of the classification mentioned above, a series of measurement points that are located on the sclera of the eye 20 is used to determine the absolute position of the laser sensors 2, 3, 4, 5, 6, 21. The number of samples used, i.e., the batch size, is a design parameter. The sclera measurement points in glasses-centered coordinates are known, i.e., $$x_{g,i} = s_{g,i} + d_i p_i \quad (1)$$

where $s_{g,i}$ is the laser position in glasses coordinates, $d_i$ the measured distance between laser and sclera, and pi the orientation of the laser, which is also known in glasses-centered coordinates.

In order to determine the sensor positions in head-centered coordinates, a transformation $$x_h = R(\theta, \phi, \rho)x_g + t \quad (2)$$

into head-centered coordinates is sought. The transformation contains the parameters $\theta$, $\phi$, $\rho$, $t_x$, $t_y$, $t_z$ to be determined. Since only sclera times are collected in the stack, the necessary conditions $$\|x_h\| = r_{sclera} \quad (3)$$

must be satisfied, where the sclera radius $r_{sclera}$ is a relatively constant parameter that can be assumed to be known. This equation can be rewritten in quadratic form:

$$x_{g,i}^T R(\theta, \varphi, \rho)^T R(\theta, \varphi, \rho)x_{g,i} + 2x_{g,i}^T R(\theta, \varphi, \rho)^T t + t^T t - r_{sclera}^2 = 0 \quad (4)$$

Since R is a unitary matrix, the equation can be further simplified to $$x_{g,i}^T x_{g,i} + 2x_{g,i}^T R(\theta, \varphi, \rho)^T t + t^T t - r_{sclera}^2 = 0 \quad (5)$$

Depending on the size of the stack, this represents a non-linear system of equations. It can be solved locally by standard methods, for example a "Levenberg-Marquardt" algorithm. As a result, the parameters for the affine transformation of glasses coordinates to head-centered coordinates are obtained, and thus the absolute sensor positions in head-centered coordinates. This solves the real problem of eye pose estimation.

FIG. 5 shows a corresponding classifier 30 for surface classification for each of the laser sensors.

FIG. 6 shows a corresponding estimator 32 for estimating absolute sensor positions and points of intersection in head-centered coordinates.

Figure 7:
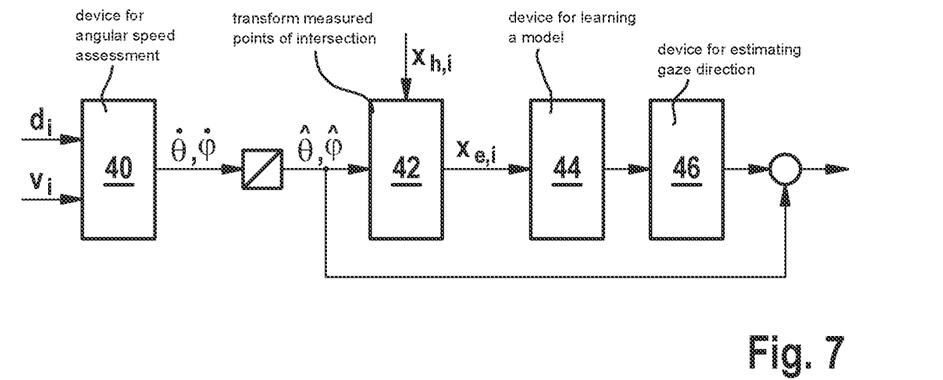
FIG. 7 shows a flowchart of an estimation of the eye position according to an exemplary embodiment of the present invention.

FIG. 7 shows a flowchart of a corresponding estimation of the eye position according to an exemplary embodiment. In a first block 40, which can also be referred to as a device for angular speed ascertainment, the angular speeds are calculated using a possible over-determined system of linear equations:

$$[n^T(e_{\hat{\theta}} \times x_i) n^T(e_{\hat{\phi}} \times x_i)]\begin{bmatrix}\dot{\theta}\\\dot{\phi}\end{bmatrix} = v_i - n^T \frac{x}{\|x\|}\dot{r} \quad (6)$$

The result of the solution of this system of equations is the angular speeds $\dot{\theta}, \dot{\phi}$ which can be further integrated and give $\hat{\theta}, \hat{\phi}$. These values are not a reliable estimate of the true gaze angle, since the initial value of the integration is unknown. At least one offset can therefore be calculated.

In order to calculate this estimation error, the measured points of intersection are transformed in a block 42 into eye-centered coordinates using $\hat{\theta}, \hat{\phi}$. By storing the data points or by training an approximative equivalent model, the outer eye geometry as shown in FIG. 6 is obtained as a reduced eye model. From this shape, the offset angle can be deduced which arises during integration, since the iris disk of the eye can be used to determine the original gaze direction. This offset $\theta_0, \phi_0$ is then further used to compensate for the initial angle estimation error that arises due to the integration. For this purpose, a block 44, which represents a device for learning a model consisting of raw data, and a block 46 is provided, which represents a device for estimating the gaze direction (offset).

Figure 8:
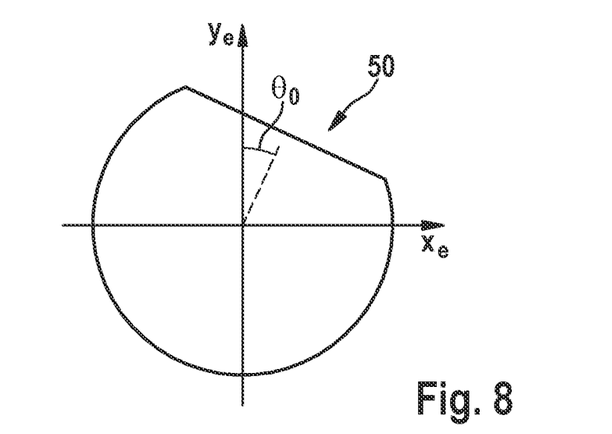
FIG. 8 shows an eye geometry with the offset according to an exemplary embodiment of the present invention.

FIG. 8 shows a corresponding eye geometry 50 with the offset $\theta_0$. The offset $\theta_0$ results due to the integration of the angular speeds, as described with reference to FIG. 5. An estimation of the eye shape in eye-centered coordinates is thus made possible.

According to an exemplary embodiment, the described approach is achieved using software. As a hardware requirement, glasses having more than two static laser sensors per eye are suitable. Such glasses contain a signal processing unit, e. g., microcontroller. To achieve the functionality a camera or a laser scanner is not necessary. According to an exemplary embodiment, the eye position is returned as a numerical value or used for correcting the projected retinal images depending on the eye position. The eye tracking works even in the case of the glasses slipping.

Using the following figures an algorithm is described for classifying laser measurements in eye and tracking applications which may be subject to the slipping problem, as is the case, for example, with data glasses.

In coordinate transformation into head coordinates a spherical sclera is assumed. Another model, for example a rotational ellipsoid, is equally possible, but does however require more parameters to be estimated or known. However, the principle remains the same.

Figure 9:
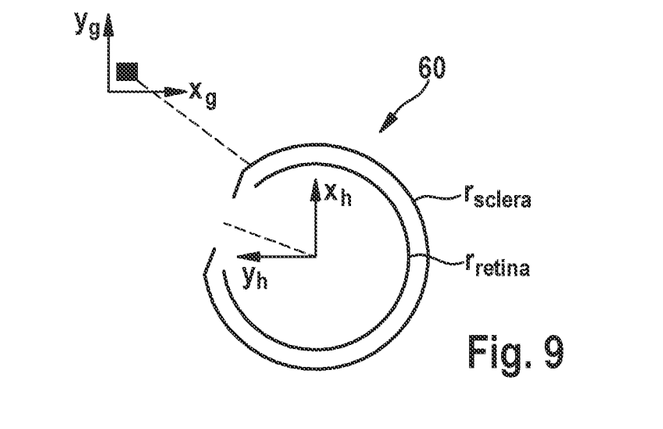
FIG. 9 shows a model of an eye according to an exemplary embodiment of the present invention.

FIG. 9 shows a model 60 of an eye. A laser beam is used to measure the distance and surface speed of the eye. Referring to FIG. 4, glasses-centered coordinates $y_g$, $x_g$ and head-centered coordinates $x_h$, $y_h$ are shown. Furthermore, a radius $r_{retina}$ of the retina and a radius $r_{sclera}$ of the sclera are shown.

According to an exemplary embodiment, the problem of classifying the measured distance and surface speed of an eye is solved using static laser interferometry. This function can then be used as a component in an eye tracker function.

Figure 10:
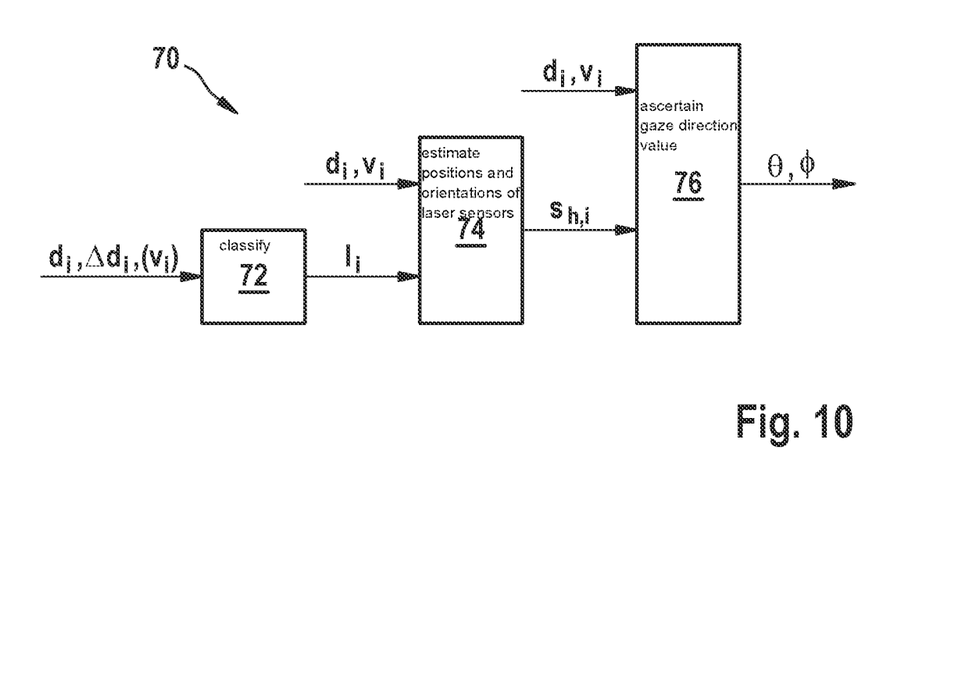
FIG. 10 shows an exemplary embodiment of an eye tracker function according to an exemplary embodiment of the present invention.

FIG. 10 shows an exemplary embodiment of a corresponding eye tracker function. In this case, only one possible structure of a method 70 or of a corresponding device for determining a direction of gaze of an eye is shown.

It is assumed that a laser sensor directed at the eye is able to provide the distance between the sensor and the surface intersection point, which is also referred to for short as the intersection point, and also the surface speed at the intersection point projected along the laser beam. Starting from these two signals, in a step 72 using a suitable classifier, a classification is made regarding which part of the eye the laser intersects. Obvious classes and thus parts of the eye are the sclera, the iris and the retina of the eye. Further classes, such as eyelids or even an error class, are added according to different exemplary embodiments.

In a step 74, using a suitable estimator, the positions and orientations of the laser sensors are estimated, and in a step 74, the gaze direction is ascertained, for example also estimated using a suitable estimator.

The method 70 makes possible the use of an eye tracker which is based exclusively on static laser sensors. Compared to camera-based systems, for example, such an approach is much leaner, which is reflected in lower power consumption, lower weight and lower material costs. Such a system is advantageous compared to a camera-based system (video-oculography system (VOG)), which typically has a much lower image refresh rate, while eye tracking requires a high refresh rate of at least 250 Hz.

The classification method described makes possible an eye-tracker system, as described with reference to FIGS. 1 to 9, and which, due to a self-calibrating property, is robust with regard to slipping of the wearable device on which the laser sensors are arranged.

According to an exemplary embodiment, the object of classifying the region of intersection of a laser beam on the eye surface is solved with a simple approach. This can be effected 1. with a simple threshold value classifier for distance measurement, and
2. with an automatic approach with threshold values for the difference of the distance signal that indicates the distance between the sensor and the surface intersection point.

In order to derive threshold parameters, the first approach requires an accurate knowledge of the position and the orientation of the laser in relation to the eye. Only then can classification be made using an if-then instruction, such as for example if d1<d<d2 then laser on sclera.

Such an approach can be prone to glitches and require a lengthy recalibration.

The second simple solution shown is based on an automaton based on the distance difference.

Figure 11:
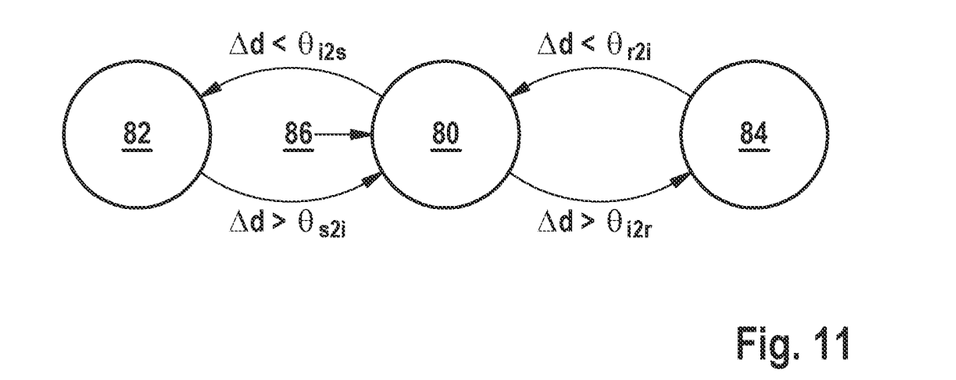
FIG. 11 shows a deterministic automaton for the difference between the distances according to an exemplary embodiment of the present invention.

FIG. 11 shows a corresponding deterministic automaton for the difference of the distances. An iris 80, a sclera 82 and a retina 84 as parts of an eye are shown schematically. An arrow 86 indicates a start of the automaton.

According to an exemplary embodiment, the approach described is based on using an edge detector for the distance difference signal, with which discontinuities are detected when the laser transitions from one part of the eye to another. Although this approach is more robust with regard to slipping than the first approach, it lacks the use of the absolute distance information. Furthermore, both approaches are deterministic and therefore as such cannot deal with uncertainties.

According to an exemplary embodiment, a probabilistic approach is therefore used, namely a hidden Markov model (HMM), in which the properties of the eye geometry are explicitly used.

Figure 12:
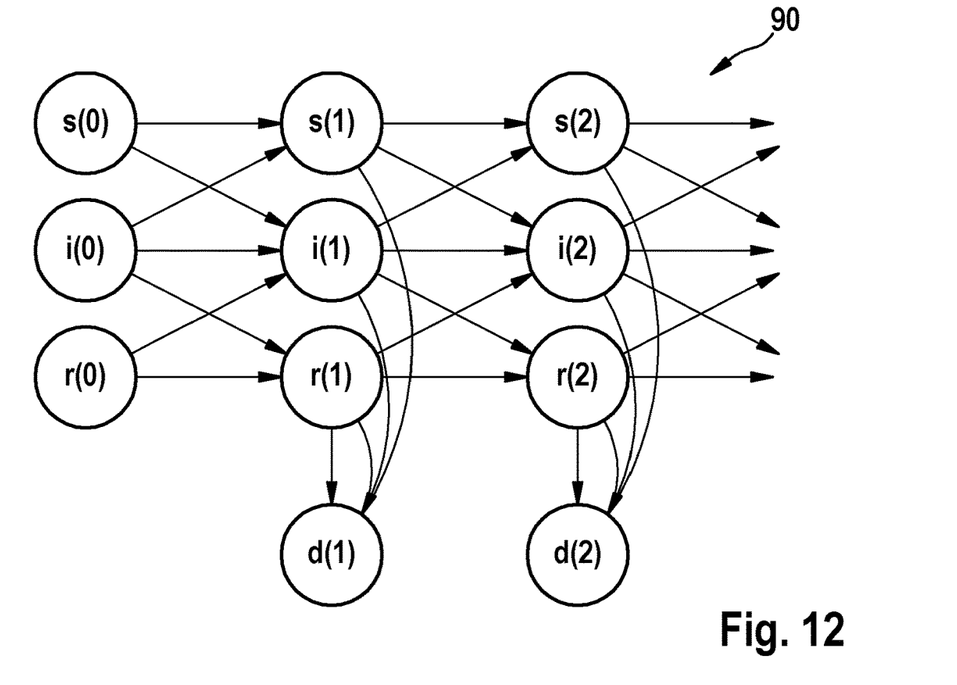
FIG. 12 shows a hidden Markov model according to an exemplary embodiment of the present invention.

FIG. 12 shows such a hidden Markov model 90 according to an exemplary embodiment as a series of developing hidden states (sclera, iris, retina) over time, with laser measurements being available for each time step. For the sclera the states s(0), s(1), s(2) are shown, for the iris the states i(0), i(1), i(2) and for the retina the states r(0), r(1), r(2).

The model uses transition probabilities for the development of hidden states and emission probabilities for the actual measurements. All probabilities in the range of 0, . . . , 1 are modeled in relation to the specific eye geometry, whereas certain parameters that depend on the a priori unknown glasses position can be derived during the transit time.

A further advantage of this approach is that, although it is based on a theoretically sound framework, the actual implementation can be effected in a computationally efficient way, so that an implementation with real-time capability is possible on hardware with limited computing speed. This is in accordance with the requirement for algorithms with a low energy consumption.

The proposed classifier can be part of an eye tracker, as shown by way of example in FIG. 11. For a detailed description of the measuring principle itself, reference is made here to the description in FIGS. 1 to 9.

It is assumed that for a laser sensor i directed at the eye, as shown in FIG. 10, the measured values $d_i$ and $v_i$ are available, as they are used as input values of the method shown using FIG. 11.

Typical distances between the laser sensors and the surface intersection points of the laser beams on the eye fall in the range of a few centimeters. The wavelength of the laser can fall in the range of 800-1050 nm, typically 850-940 nm.

Figure 13:
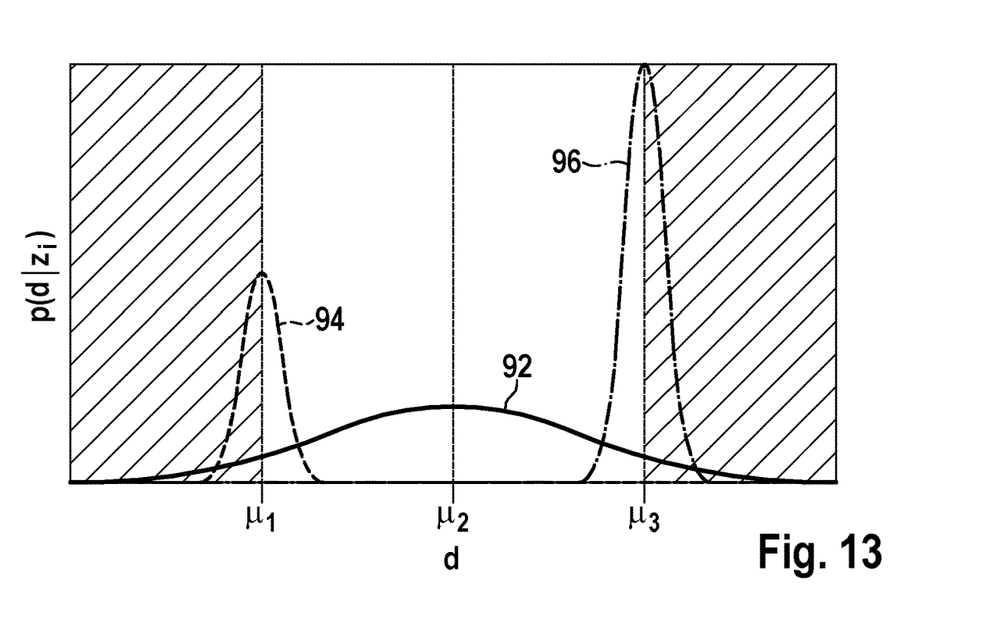
FIG. 13 shows normal distributions for conditional emission probabilities according to an exemplary embodiment of the present invention.

According to an exemplary embodiment, the part of the eye (sclera, iris, retina) at which the laser is directed is recognized. These markings are required for the further processing of the measurements and correspond to the hidden states z of the hidden Markov model as shown in FIG. 13. The emission probabilities in the range of 0, . . . , 1 are modeled as a mixture of Gaussian distributions.

FIG. 13 shows exemplary normal distributions for corresponding conditional emission probabilities. A normal distribution 92 is the iris, another normal distribution 94 is the sclera and yet another normal distribution 96 is assigned to the retina.

Figure 14:
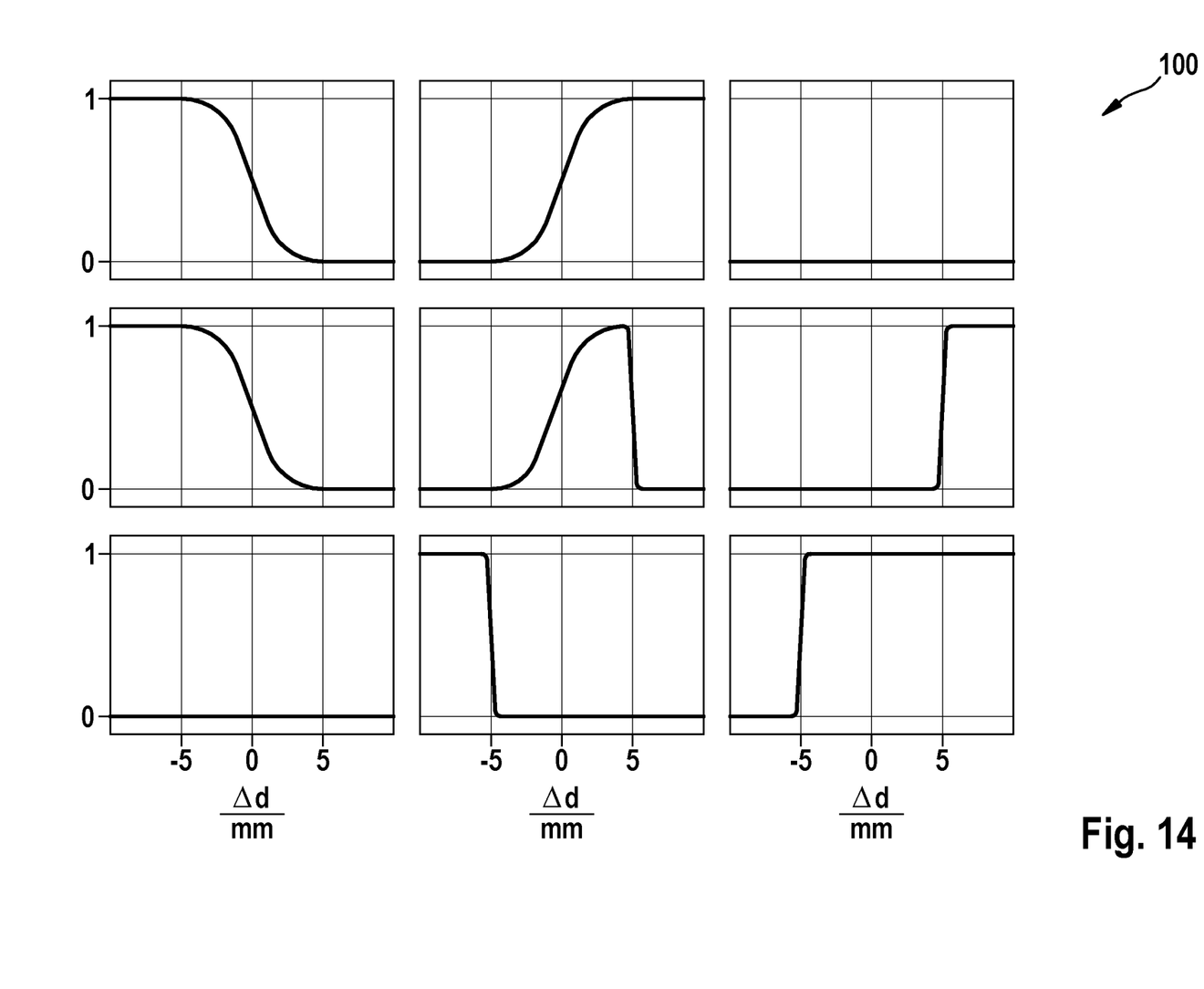
FIG. 14 shows a matrix having transition probabilities according to an exemplary embodiment of the present invention.

FIG. 14 shows a matrix 100 in which the transition probabilities from a hidden state z(k) to the following state z(k+1) are modeled as a constant matrix A(d).

The top row is assigned to the sclera, the middle row to the iris and the bottom row to the retina. The left-hand column is assigned to a transition to the sclera, the middle column to a transition to the iris and the right-hand column to a transition to the retina.

Using the following update equations the unknown parameters of the hidden Markov model, i.e., the parameters of the emission probabilities, are iteratively updated taking into account the last N data points:

$$\lambda_i = \min\left\{\frac{N^* - \gamma(z_i(k))}{N'_i}, 1\right\} \quad (12a)$$

$$N_i = \lambda_i N'_i + \gamma(z_i(T)) \quad (12b)$$

$$\pi_i = \frac{\lambda_i(T-1)\pi'_i + \gamma(z_i(T))}{\lambda_i(T-1) + 1} \quad (12c)$$

$$\mu_i = \frac{\lambda_i N'_i \mu'_i + \gamma(z_i(T))d(T)}{\lambda_i N'_i + \gamma(z_i(T))} \quad (12d)$$

$$\sigma_i = \frac{\lambda_i N'_i \sigma'_i + \gamma(z_i(T))(d(T) - \mu_i)^2}{\lambda_i N'_i + \gamma(z_i(T))} \quad (12e)$$

$\lambda_i$ represents a forgetting factor in the range of 0, . . . , 1, while $N_i$ is the number of effective points that support a cluster. It denotes a positive weight of a cluster within the Gaussian mixture distribution, while $\mu_i$ is the mean value of a cluster, typically in the range of a few centimeters, and $\sigma_i$ is its corresponding variance.

On the basis of these statistics, the following equation makes it possible to evaluate the responsibility of a cluster $z_i$ for a data point d(k), i.e., the most probable cluster to which a laser measurement belongs can be determined:

$$\gamma(z_i(k)) := E[z_i(k)] = \frac{\left(\sum_j a_{ij} z_j(k-1)\right) \pi_i N(d(k) \mid \mu'_i, \sigma'_i)}{\sum_h \left(\sum_j a_{ij} z_j(k-1)\right) \pi_h N(d(k) \mid \mu'_h, \sigma'_h)} \quad (13)$$

This scheme is a typical expectation maximization approach and can be summarized as follows:
Algorithm 1 classification algorithm.
  Init: N*, $z_0$
  for k=1, . . . , T do
    get measurements d(k); Δd(k)
    update the transition probability matrix A(Δd(k))
    update the statistics (12)
    sort the clusters by μi in ascending order
    classify the measurement d(k) using (13), where d is
      limited to the interpolation region.
  end for Advantageously, this algorithm can be performed on-line and is therefore suitable for sequential data. In addition, it includes a certain exponential property for forgetting in order to include only the latest and thus
  relevant data points. This property is important for the
    classifier to be able to adapt in the event of the glasses
    slipping.

Figure 15:
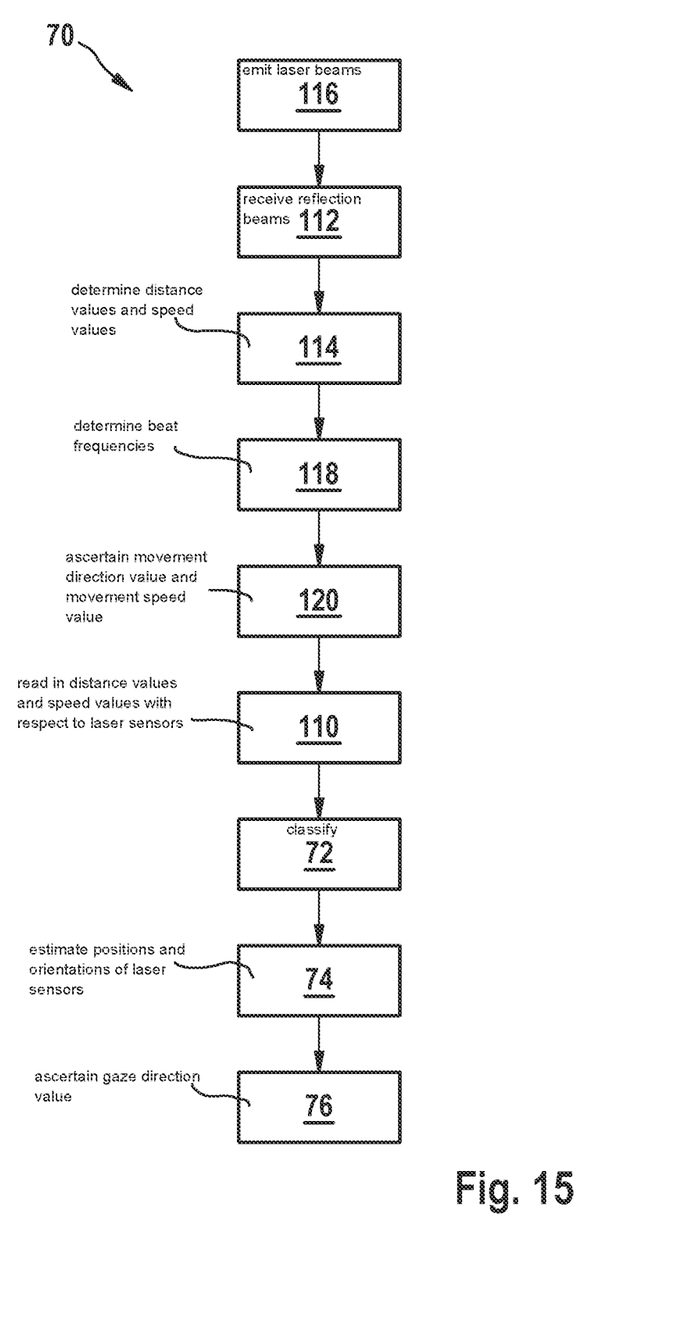
FIG. 15 shows a flowchart of a method for determining a direction of gaze of an eye according to an exemplary embodiment of the present invention.

FIG. 15 shows a flowchart of a method 70 for determining a direction of gaze of an eye 20 according to an exemplary embodiment.

In a step 110, distance values ($d_i$) and speed values ($v_i$) with respect to the laser sensors used are read and in a step 76 are used to ascertain a gaze direction value (θ, Φ) which represents the gaze direction, as already described, for example, with reference to FIG. 11.

For this purpose, according to an exemplary embodiment, the distance values ($d_i$) and the speed values ($v_i$) are classified in a step 72 in order to obtain classification values ($l_i$) which in turn can be used in step 76 to ascertain the gaze direction value (θ, Φ). For this purpose, according to an exemplary embodiment, in an estimation step 74, position value ($s_{h,i}$) is estimated and used in step 76 to ascertain the gaze direction value (θ, Φ).

According to an exemplary embodiment, at least three laser sensors are used to determine an absolute position (triliteration).

Optionally, in a step 112, reflection beams are received which represent portions of the laser beams emitted by the laser sensors and reflected or scattered at parts of the eye. In a step 114, the distance values ($d_i$) and the speed values ($v_i$) are determined using a fluctuation in a radiation intensity of the reflection beams.

Optionally, in a step 116 the laser beams mentioned are emitted at a constant wavelength, and in step 114 the speed values ($v_i$) are determined while the laser beams are being emitted at a constant wavelength.

The fluctuation of the radiation intensity or of the radiation power of a laser due to constructive and destructive interference from radiation reflected back from a moving object and coupled back into the resonator of the relevant laser sensor at a constant wavelength of the radiation generated by the laser is thus used to calculate the speed of the object, here the corresponding part of the eye.

According to an exemplary embodiment, in step 116, the laser beams are emitted in a different time interval not at a constant wavelength but at a changing wavelength, and in step 114 the distance values ($d_i$) are determined while the laser beams are being emitted at a changing wavelength.

The fluctuation of the radiation intensity or radiation power of the laser due to constructive and destructive interference from radiation reflected back from an object that is "not" moving in relation to the laser and coupled back into the resonator in the case of wavelength variation of the radiation generated by the laser by means of laser current modulation, for example, can thus be used to calculate the distance from the object. For example, the calculation can be made from the frequency of the peak amplitude of the radiation power.

If both effects are used together, the movement of the object results in a fluctuation in the radiation power of a first frequency and due to the change in the wavelength of the laser radiation a fluctuation of the radiation power of a second frequency occurs, so that a beat is created (beat frequency).

The distance of the object can be determined from the mean value of the beat frequencies, for example in the case of a triangular modulation of the laser current with increases and decreases of the laser current. The direction of movement and the speed of the object can be determined from the difference between the beat frequencies in the case of triangular modulation of the laser current. This mixed use of effects is the basis of a large number of exemplary embodiments.

According to an exemplary embodiment, in an optional step 118 corresponding beat frequencies are determined using the fluctuations in the radiation intensities of the reflection beams while the laser beams are being emitted at the constant and at the changing wavelength. In an optional step 120, a movement direction value which represents a direction of movement of the eye and a movement speed value which represents a movement speed of the eye is ascertained using a mean value of the beat frequencies. In this case, the gaze direction value (θ, Φ) can be ascertained in step 76 using the movement direction value and the movement speed value of the eye.

The two effects mentioned can thus be used jointly or separately. According to an exemplary embodiment, both effects are required, since not only distance measurements but also speed measurement data are required for determining the position of the eye. As a further embodiment, measurement of the distance can be switched off or on by the modulation of the laser being switched off or on by means of a triangle, for example. As a result, the speed can be ascertained better or more precisely for the cases in which the modulation is switched off.

The invention claimed is:

1. A method for determining a direction of gaze of an eye for data glasses, the method comprising the following steps:

reading a first distance value and a first speed value, wherein the first distance value represents a distance between a first laser sensor configured to emit a first laser beam and a first surface intersection point of the first laser beam on the eye, and wherein the first speed value represents a surface speed at the first surface intersection point;

reading a second distance value and a second speed value, wherein the second distance value represents a distance between a second laser sensor configured to emit second laser beam and a second surface intersection point of the second laser beam on the eye, and wherein the second speed value represents a surface speed at the second surface intersection point;

reading at least a third distance value and a third speed value, wherein the third distance value represents a distance between a third laser sensor configured to emit a third laser beam and a third surface intersection point of the laser beam on the eye, and wherein the third speed value represents a surface speed at the third surface intersection point;

classifying the first, second, and third distance values and the first, second, and third speed values to obtain a first classification value that indicates a part of the eye associated with the first surface intersection point, to obtain a second classification value that indicates a part of the eye associated with the second surface intersection point, and to obtain a third classification value that indicates a part of the eye associated with the third surface intersection point;

determining a first absolute value which represents a pose of the first laser sensor in head-centered coordinates of a head-centered coordinate system, a second absolute value which represents a pose of the second laser sensor in the head-centered coordinates, and a third absolute value which represents a pose of the third laser sensor in the head-centered coordinates, using the first, second, and third distance values and the first, second, and third classification values;

determining angular speeds which represent an eye surface speed of the eye using the surface intersection points and a linkage between the head-centered coordinate system and the glasses coordinate system;

determining an offset-encumbered gaze direction using the angular speeds; and ascertaining a gaze direction value which represents the gaze direction using the offset-encumbered gaze direction and an offset for correcting the offset-encumbered gaze direction.

2. The method according to claim 1, further comprising:
determining parameters of the linkage between the head-centered coordinate system and the glasses coordinate system using position values, the first, second, and third distance values, and also known geometric assumptions of the eye.

3. The method according to claim 1, wherein the offset-encumbered gaze direction is determined by integrating the angular speeds.

4. The method according to claim 1, wherein the offset is determined using an eye surface model that is determined from the first, second, and third distance values, the first, second, and third speed values, and the first, second, and third surface intersection points.

5. The method according to claim 4, further comprising: continuously learning the eye surface model over time from captured data points.

6. The method according to claim 1, further comprising:
receiving a first reflection beam which represents a reflection or scattering of the first laser beam at the first surface intersection point;
receiving a second reflection beam which represents a reflection or scattering of the second laser beam at the second surface intersection point;
receiving a third reflection beam which represents a reflection or scattering of the third laser beam at the third surface intersection point;
determining: (i) the first distance value and the first speed value using a fluctuation in a radiation intensity of the first reflection beam, (ii) the second distance value and the second speed value using a fluctuation in a radiation intensity of the second reflection beam, and (iii) the third speed value using a fluctuation in a radiation intensity of the third reflection beam.

7. The method according to claim 6, further comprising:
emitting the first laser beam at a constant wavelength
emitting the second laser beam at a constant wavelength; and
emitting the third laser beam at a constant wavelength;
wherein the first speed value is determined using the fluctuation in the radiation intensity of the first reflection beam while the first laser beam is being emitted at the constant wavelength, the second speed value is determined using the fluctuation in the radiation intensity of the second reflection beam while the second laser beam is being emitted at the constant wavelength, and the third speed value is determined using the fluctuation in the radiation intensity of the third reflection beam while the third laser beam is being emitted at the constant wavelength.

8. The method according to claim 6, in which, in the emitting of the first, second, and third laser beams, the first laser beam is emitted at changing wavelength during a first further time interval, the second laser beam is emitted at changing wavelength during a second further time interval, and the third laser beam is emitted at changing wavelength during a third further time interval, wherein in the determining using the fluctuations, the first distance value is determined using the fluctuation in the radiation intensity of the first reflection beam while the first laser beam is being emitted at the changing wavelength, the second distance value is determined using the fluctuation in the radiation intensity of the second reflection beam while the second laser beam is being emitted at the changing wavelength, the third distance value is determined using the fluctuation in the radiation intensity of the third reflection beam while the third laser beam is being emitted at the changing wavelength.

9. The method according to claim 8, further comprising:
determining: (i) a first beat frequency using the fluctuations in the radiation intensity of the first reflection beam while the first laser beam is being emitted at the constant and at the changing wavelength, (ii) a second beat frequency using the fluctuations in the radiation intensity of the second reflection beam while the second laser beam is being emitted at the constant and at the changing wavelength, and (iii) determining a third beat frequency using the fluctuations in the radiation intensity of the third reflection beam while the third laser beam is being emitted at the constant and at the changing wavelength; and
determining a movement direction value which represents a movement direction value of the eye, and determining a movement speed value which represents a movement speed of the eye, using a mean value of the first, second, and third beat frequencies, wherein in the ascertainment step the gaze direction value is ascertained using the movement direction value and the movement speed value of the eye.

10. A device for determining a direction of gaze of an eye for data glasses, wherein the device is configured to:
read a first distance value and a first speed value, wherein the first distance value represents a distance between a first laser sensor configured to emit a first laser beam and a first surface intersection point of the first laser beam on the eye, and wherein the first speed value represents a surface speed at the first surface intersection point;
read a second distance value and a second speed value, wherein the second distance value represents a distance between a second laser sensor configured to emit second laser beam and a second surface intersection point of the second laser beam on the eye, and wherein the second speed value represents a surface speed at the second surface intersection point;
read at least a third distance value and a third speed value, wherein the third distance value represents a distance between a third laser sensor configured to emit a third laser beam and a third surface intersection point of the laser beam on the eye, and wherein the third speed value represents a surface speed at the third surface intersection point;
classify the first, second, and third distance values and the first, second, and third speed values to obtain a first classification value that indicates a part of the eye associated with the first surface intersection point, to obtain a second classification value that indicates a part of the eye associated with the second surface intersection point, and to obtain a third classification value that indicates a part of the eye associated with the third surface intersection point;
determine a first absolute value which represents a pose of the first laser sensor in head-centered coordinates of a head-centered coordinate system, a second absolute value which represents a pose of the second laser sensor in the head-centered coordinates, and a third absolute value which represents a pose of the third laser sensor in the head-centered coordinates, using the first, second, and third distance values and the first, second, and third classification values;
determine angular speeds which represent an eye surface speed of the eye using the surface intersection points and a linkage between the head-centered coordinate system and the glasses coordinate system;
determine an offset-encumbered gaze direction using the angular speeds; and
ascertain a gaze direction value which represents the gaze direction using the offset-encumbered gaze direction and an offset for correcting the offset-encumbered gaze direction.

11. Data glasses, comprising:
at least three laser sensors configured to emit laser beams in a direction of an eye and to receive reflection beams of the laser beams reflected at the eye; and a device for determining a direction of gaze of an eye for data glasses, wherein the device is configured to:
  read a first distance value and a first speed value, wherein the first distance value represents a distance between a first laser sensor of the at least three laser sensors configured to emit a first laser beam and a first surface intersection point of the first laser beam on the eye, and wherein the first speed value represents a surface speed at the first surface intersection point;
  read a second distance value and a second speed value, wherein the second distance value represents a distance between a second laser sensor of the at least three laser sensors configured to emit second laser beam and a second surface intersection point of the second laser beam on the eye, and wherein the second speed value represents a surface speed at the second surface intersection point;
  read at least a third distance value and a third speed value, wherein the third distance value represents a distance between a third laser sensor of the at least three laser sensors configured to emit a third laser beam and a third surface intersection point of the laser beam on the eye, and wherein the third speed value represents a surface speed at the third surface intersection point;
  classify the first, second, and third distance values and the first, second, and third speed values to obtain a first classification value that indicates a part of the eye associated with the first surface intersection point, to obtain a second classification value that indicates a part of the eye associated with the second surface intersection point, and to obtain a third classification value that indicates a part of the eye associated with the third surface intersection point;
  determine a first absolute value which represents a pose of the first laser sensor in head-centered coordinates of a head-centered coordinate system, a second absolute value which represents a pose of the second laser sensor in the head-centered coordinates, and a third absolute value which represents a pose of the third laser sensor in the head-centered coordinates, using the first, second, and third distance values and the first, second, and third classification values;
  determine angular speeds which represent an eye surface speed of the eye using the surface intersection points and a linkage between the head-centered coordinate system and the glasses coordinate system;
  determine an offset-encumbered gaze direction using the angular speeds; and
  ascertain a gaze direction value which represents the gaze direction using the offset-encumbered gaze direction and an offset for correcting the offset-encumbered gaze direction.

12. A non-transitory machine-readable storage medium on which is stored a computer program for determining a direction of gaze of an eye for data glasses, the computer program, when executed by a computer, causing the computer to perform the following steps:
  reading a first distance value and a first speed value, wherein the first distance value represents a distance between a first laser sensor configured to emit a first laser beam and a first surface intersection point of the first laser beam on the eye, and wherein the first speed value represents a surface speed at the first surface intersection point;
  reading a second distance value and a second speed value, wherein the second distance value represents a distance between a second laser sensor configured to emit second laser beam and a second surface intersection point of the second laser beam on the eye, and wherein the second speed value represents a surface speed at the second surface intersection point;
  reading at least a third distance value and a third speed value, wherein the third distance value represents a distance between a third laser sensor configured to emit a third laser beam and a third surface intersection point of the laser beam on the eye, and wherein the third speed value represents a surface speed at the third surface intersection point;
  classifying the first, second, and third distance values and the first, second, and third speed values to obtain a first classification value that indicates a part of the eye associated with the first surface intersection point, to obtain a second classification value that indicates a part of the eye associated with the second surface intersection point, and to obtain a third classification value that indicates a part of the eye associated with the third surface intersection point;
  determining a first absolute value which represents a pose of the first laser sensor in head-centered coordinates of a head-centered coordinate system, a second absolute value which represents a pose of the second laser sensor in the head-centered coordinates, and a third absolute value which represents a pose of the third laser sensor in the head-centered coordinates, using the first, second, and third distance values and the first, second, and third classification values;
  determining angular speeds which represent an eye surface speed of the eye using the surface intersection points and a linkage between the head-centered coordinate system and the glasses coordinate system;
  determining an offset-encumbered gaze direction using the angular speeds; and
  ascertaining a gaze direction value which represents the gaze direction using the offset-encumbered gaze direction and an offset for correcting the offset-encumbered gaze direction.

* * * * *